US012522975B1

(12) United States Patent
Syal et al.

(10) Patent No.: US 12,522,975 B1
(45) Date of Patent: Jan. 13, 2026

(54) AUTOMATED STEAM PROCESSING SYSTEM FOR APPAREL

(71) Applicant: The RealReal, Inc., San Francisco, CA (US)

(72) Inventors: Anurag Syal, Nashville, TN (US); Hasan Cheema, San Francisco, CA (US); Marcos Toscano, Montevideo (UY); John Paul Dombrowski, Campbell, CA (US); Agostina Larrazabal, Parana (AR)

(73) Assignee: The RealReal, Inc., San Francisco, CA (US)

( * ) Notice: Subject to any disclaimer, the term of this patent is extended or adjusted under 35 U.S.C. 154(b) by 54 days.

(21) Appl. No.: 18/656,425

(22) Filed: May 6, 2024

Related U.S. Application Data

(60) Provisional application No. 63/500,156, filed on May 4, 2023.

(51) Int. Cl.
| | | |
|---|---|---|
| *D06F 73/02* | (2006.01) | |
| *G06T 5/77* | (2024.01) | |
| *G06T 7/00* | (2017.01) | |

(52) U.S. Cl.
CPC .............. *D06F 73/02* (2013.01); *G06T 5/77* (2024.01); *G06T 7/0004* (2013.01); *G06T 2207/20081* (2013.01); *G06T 2207/20084* (2013.01); *G06T 2207/30124* (2013.01)

(58) Field of Classification Search
CPC .......... D06F 73/02; G06T 5/77; G06T 7/0004
See application file for complete search history.

(56) References Cited

U.S. PATENT DOCUMENTS

| | | | | |
|---|---|---|---|---|
| 2019/0259190 | A1* | 8/2019 | Kristal | ................... G06T 11/60 |
| 2020/0096954 | A1* | 3/2020 | Kim | ........................ D06F 34/18 |
| 2020/0208319 | A1* | 7/2020 | Lee | .......................... D06F 34/28 |
| 2021/0303868 | A1* | 9/2021 | Yeo | ........................ G06F 16/583 |
| 2021/0334935 | A1* | 10/2021 | Grigoriev | ................. G06T 5/77 |

FOREIGN PATENT DOCUMENTS

| | | | | |
|---|---|---|---|---|
| CN | 112064311 A | * | 12/2020 | ............. G05D 27/02 |

OTHER PUBLICATIONS

IEEE, Ng et al., "Wrinkle Detection Using Hessian Line Tracking," in *IEEE Access*, vol. 3, pp. 1079-1088, 2015, doi: 10.1109/ACCESS. 2015.2455871.

(Continued)

*Primary Examiner* — Uyen T Nguyen
(74) *Attorney, Agent, or Firm* — Adibi IP Group, PC; Amir V. Adibi; Andrew C. Palmer

(57) ABSTRACT

Methods and apparatus for automatic steaming of apparel are disclosed. In one embodiment, a method is provided that includes detecting a wrinkle in an image of an item, determining whether the wrinkle is correctable using image processing, and performing image processing on the image to correct the wrinkle when the wrinkle is correctable. The method also comprises generating steam instructions when the wrinkle is not correctable and steaming the item in accordance with the steam instructions to correct the wrinkle.

4 Claims, 15 Drawing Sheets

(4 of 15 Drawing Sheet(s) Filed in Color)

STUDIO PROCESSING SYSTEM

(56) References Cited

OTHER PUBLICATIONS

FreedomVC, Alan Wong, "Gabor Filter in Edge Detection," [published online Oct. 16, 2021], [retrieved on Apr. 23, 2023]. Retrieved from the Internet <https://www.freedomvc.com/index.php/2021/10/16/gabor-filter-in-edge-detection/>.

GitHub, Jiahui Yu, "DeepFill v1/v2 with Contextual Attention and Gated Convolution, CVPR 2018, and ICCV 2019 Oral," [online], [retrieved on Apr. 24, 2023]. Retrieved from the Internet <https://github.com/JiahuiYu/generative_inpainting>.

International Journal of Computer Science and Information Technologies, Mawale et al., "Detecting Facial Wrinkles based on Gabor Filter using Geometric Constraints," in vol. 7 (4), 2016, pp. 2021-2025, ISSN: 0975-9646.

GitHub, "Image Inpainting," OpenCV-Python Tutorials, [online], [Jun. 7, retrieved 202]. Retrieved from the Internet <https://opencv24-python-tutorials.readthedocs.io/en/latest/py_tutorials/py_photo/py_inpainting py_inpainting.html>.

Scikit-Image, "Inpainting—skimage v0.20.0 docs," Filtering and restoration, [online], [retrieved on Apr. 24, 2023]. Retrieved from the Internet <https://scikit-image.org/docs/stable/auto_examples/filters/plot_inpaint.html>.

Stack Overflow, "How to augment scanned document image with creases, folds and wrinkles?" [published online Oct. 9, 2020]. Retrieved from the Internet <https://stackoverflow.com/questions/64278790/how-to-augment-scanned-document-image-with-creases-folds-and-wrinkles>.

Scikit-Image, "Ridge operators—skimage v0.20.0 docs," Edges and lines, [online], [retrieved on Apr. 24, 2023]. Retrieved from the Internet <https://scikit-image.org/docs/stable/auto_examples/edges/plot_ridge_filter.html>.

Nazre Batool, Rama Chellappa. Detection and Inpainting of Facial Wrinkles Using Texture Orientation Fields and Markov Random Field Modeling. *IEEE Transactions on Image Processing*, 2014, 23, pp. 3773-3788. ff10.1109/TIP.2014.2332401ff. ffhal-01096624ff.

\* cited by examiner

STUDIO PROCESSING SYSTEM

OVERVIEW AUTO-STEAM PROCESSING SYSTEM

STEAM PROCESSING

STUDIO PROCESSING SYSTEM

AUTO-STEAM PROCESSING SYSTEM

OVERVIEW OF ITEM PROCESSING PIPELINE

OVERVIEW OF A USER INTERFACE FOR WRINKLE REMOVAL

OVERVIEW OF ML MODEL FOR WRINKLE REMOVAL

OVERVIEW FOR TRAINING UNET MODEL TO GENERATE MASK

STEAM CLOSET CONTROL SYSTEM

STEAM CLOSET

API ACCESS TO IMAGE RETOUCHING SYSTEM

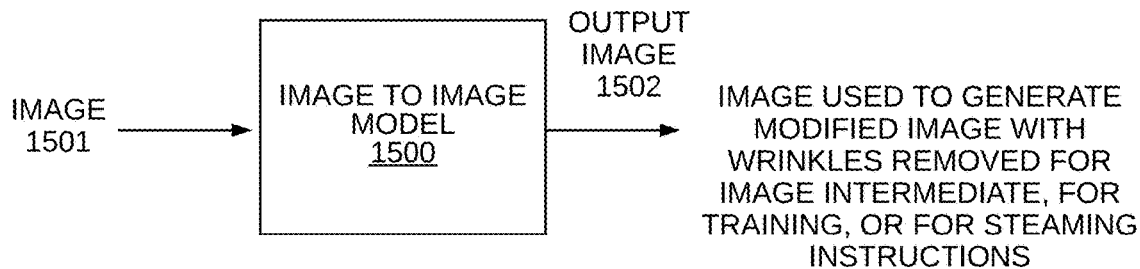
IMAGE TO IMAGE MODEL
FIG. 15
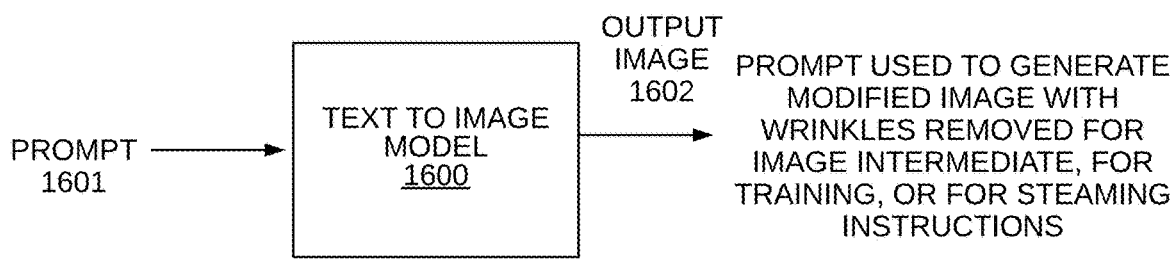
TEXT TO IMAGE MODEL
FIG. 16
PROMPT
1601
{
   SKU/ID: "13135"
   TEXT DESCRIPTION: "Oversized Distressed Logo-Print Cotton-Jersey T-Shirt"
   SOURCE/MAKE/BRAND: "BALENCIAGA"
   COLOR: "BLACK"
   SIZE: "L"
   VIEW: "FRONT"
   ON/OFF MANNEQUIN: "0"
   LIGHTING: "MEDIUM SOFT LIGHT SHADOWLESS BACKDROP"
}
EXAMPLE PROMPT
FIG. 17

USING MACHINE LEARNING MODEL TO GENERATE MODIFIED IMAGE WITH REDUCED WRINKLES

AUTOMATED STEAM PROCESSING SYSTEM FOR APPAREL

CROSS REFERENCE TO RELATED APPLICATIONS

This application claims the benefit under 35 U.S.C. § 119 from U.S. Provisional Patent Application Ser. No. 63/500,156, entitled "Automated Steam Processing System For Apparel," filed on May 4, 2023, the subject matter of which is incorporated herein by reference.

TECHNICAL FIELD

The present invention relates generally to steaming systems, and more specifically, automated garment steaming systems.

BACKGROUND INFORMATION

Retail providers typically offer many types of items for sale and carry a significant variety of inventory. Such retailers often sell items using online commerce platforms. These online commerce platforms provide customers with the functionality to purchase items from retailers through websites or through mobile applications. The customer accesses online commerce platforms via their desktop or mobile internet browsers or via a mobile application downloaded and installed on their mobile device. After selecting an item of interest to view, the customer is presented with a Product Description Page (PDP).

The PDP provides the customer with information in connection with the selected item of interest, including one or more images, price information, and a description of the item. The customer is able to purchase the selected item via the PDP. In cases where the item being sold and displayed on the PDP is a garment, the garment tends to get wrinkled during transport to an imaging staging area. Before images of the item are captured for PDP purposes, the item undergoes a wrinkle removal process; however, known wrinkle removal solutions are generally slow and can process only a few items at once.

SUMMARY

In various embodiments, a system is provided for automatic steaming of apparel. In one embodiment, an item of apparel is received and tagged with identifying information. An image of the item is captured for the purpose of creating a PDP for the item. A wrinkle detection process is performed to detect wrinkles in the captured image. If no wrinkles are detected, the image is used to create the PDP of the item, and the item is moved to available inventory. If small or minor wrinkles are detected, image processing is performed to correct and/or remove these wrinkles from the captured image. If more significant wrinkles are detected, the item is sent to an automatic steaming process where the wrinkles are physically removed. After the steaming process is completed, a new image of the item is captured and wrinkle detection is performed again. Once the captured image passes a quality check and is essentially wrinkle-free or has only very minor wrinkles visible, the captured image is used to create the PDP for the item.

In one embodiment, the automatic steaming process utilizes a steam cabinet (or closet) to steam multiple items at the same time. The closets contain an entire rack of items that have been organized depending on the fabric content. The temperature of the steaming depends on fabric composition and/or any other characteristic of the items. Steaming instructions are provided that control the steaming process for each group of items. If an item is severely wrinkled, the item is sent to a manual steaming process where an operator performs manual steaming to remove the wrinkles. The automatic steaming process for each item may be performed one or more times until the wrinkles have been reduced to an acceptable level. The item is then returned to the image capture process.

In one embodiment, a method is provided that includes detecting a wrinkle in an image of an item, determining whether the wrinkle is correctable using image processing, performing image processing on the image to correct the wrinkle when the wrinkle is correctable. The method also comprises generating steam instructions when the wrinkle is not correctable and steaming the item in accordance with the steam instructions to correct the wrinkle.

In another embodiment, an apparatus is provided that comprises an imaging device configured to capture an image of an item and a wrinkle repair processor configured to detect a wrinkle in the image, determine whether the wrinkle is correctable, and perform image processing on the image to correct the wrinkle when the wrinkle is correctable. The apparatus also comprises a controller configured to generate steam instructions that are used to steam the item when the wrinkle is not correctable.

Further details and embodiments and methods are described in the detailed description below. This summary does not purport to define the invention. The invention is defined by the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, where like numerals indicate like components, illustrate embodiments of the invention.

FIG. 15 is a diagram of an image to image model 1500 usable by the automated steam processing system 1400 in generating modified images with reduced wrinkles.

FIG. 16 is a diagram of a text to image model 1600 usable by the automated steam processing system 1400 in generating modified images with reduced wrinkles.

FIG. 17 is a diagram of one example of a prompt 1601 supplied to the text to image model 1600 in generating modified images with reduced wrinkles.

DETAILED DESCRIPTION

Reference will now be made in detail to some embodiments of the invention, examples of which are illustrated in the accompanying drawings.

Figure 1:
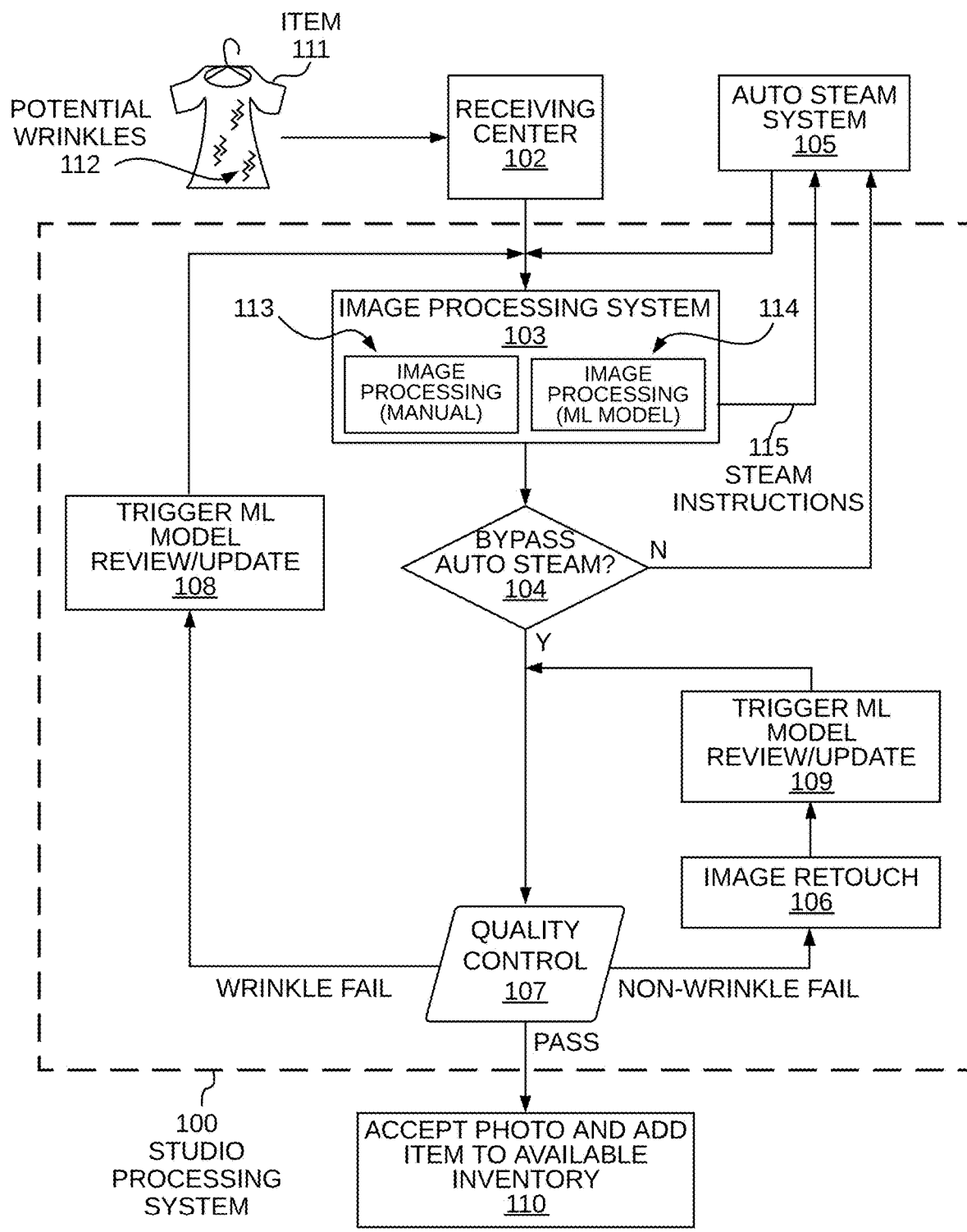
FIG. 1 is a diagram of a studio processing system configured to acquire images of items and to provide automatic garment steaming.

FIG. 1 is a diagram of a studio processing system 100 configured to acquire images of items and to provide automatic garment steaming. In one embodiment, the system 100 is configured to receive an item 111, such as a garment that has wrinkles 112, and to capture an image of the item 111 that will be used to prepare a PDP of the item.

During operation, the item 111 is received by a receiving center 102. The item 114 usually has a certain amount of wrinkles 112 resulting from packing and shipping. The receiving center 102 obtains information about the item 111 and tags the item using a label, barcode, QR code, or any other suitable type of label so that the tag can be used to identify the item and its characteristics, such as type of item, color, size, material, and any other characteristic of the item. The tagged item is then sent to the studio processing system 100 so that an image of the item 111 can be captured for use in preparing a PDP of the item 111. For example, tagged items leave the receiving center 102 hanging on movable racks that are moved to the studio processing system 100.

The studio processing system 100 comprises an image processing system 103 that captures images of received items. To obtain the best images of the items, the image processing system 103 utilizes a machine-learning (ML) model 114 to automatically adjust image parameters and to remove wrinkles that appear in the image of the item. For example, the ML model 114 can automatically process the image of the item so that small wrinkles are not visible in the image.

In one embodiment, the wrinkles in the item are more pronounced, or the color patterns of the item are such that the ML model 114 is unable to remove the wrinkles from the image of the item. In this case, manual image processing 113 is performed by an operator to manually adjust the image of the item so that the wrinkles are not visible in the image. As a result of the manual operations, the ML model 114 can be trained or updated to improve its ability to remove wrinkles from item images.

If the wrinkles of an item are so pronounced that they cannot be removed through image processing, the image processing system 103 enables an automatic steam process to be performed on the item to remove or reduce the wrinkles. A determination is made at block 104 as to whether the item requires automatic steaming. For example, if the item requires steaming, the steaming process is not bypassed and the item is sent to an auto steam system 105. After the steaming is complete, the item is returned to the image processing system 103 for additional image capture and processing.

If physical steaming is not needed, the image of the item is checked by a quality control (QC) system at block 107. At the QC check, the image of the item is checked to verify that the image quality meets a selected standard. For example, the processed image of the item may not meet quality control standards to allow the image of the item to be used to produce a PDP of the item.

If the image of the item fails the QC check due to wrinkles being visible in the image, then block 108 is enabled to trigger a review and/or update of the ML model 114 so that the image can be reprocessed to remove any visible wrinkles. The image processing system 103 is then enabled to reprocess the image to remove the wrinkles. If the image processing system 103 is unable to remove the wrinkles visible in the image of the item, then the item may require more steaming. In this case, the item is sent back to the auto steam system 105 through block 104.

If the image of the item fails the QC check due to non-wrinkles issues with the image, such as problems with white balance, contrast, color temperature, sharpness, stray artifacts or noise, item cropping, exposure issues, or any other issue, the image processing system 103 is invoked to retouch the image at block 106 and a review and/or update of the ML model 114 is triggered (see block 109) to update the ML model 114 as needed. The retouched image output from block 106 then undergoes another QC check at block 107.

If the image of the item passes the QC check at block 107, then the image is accepted for use in producing a PDP of the item 111, and the item 111 is added to available inventory at block 110.

Figure 2:
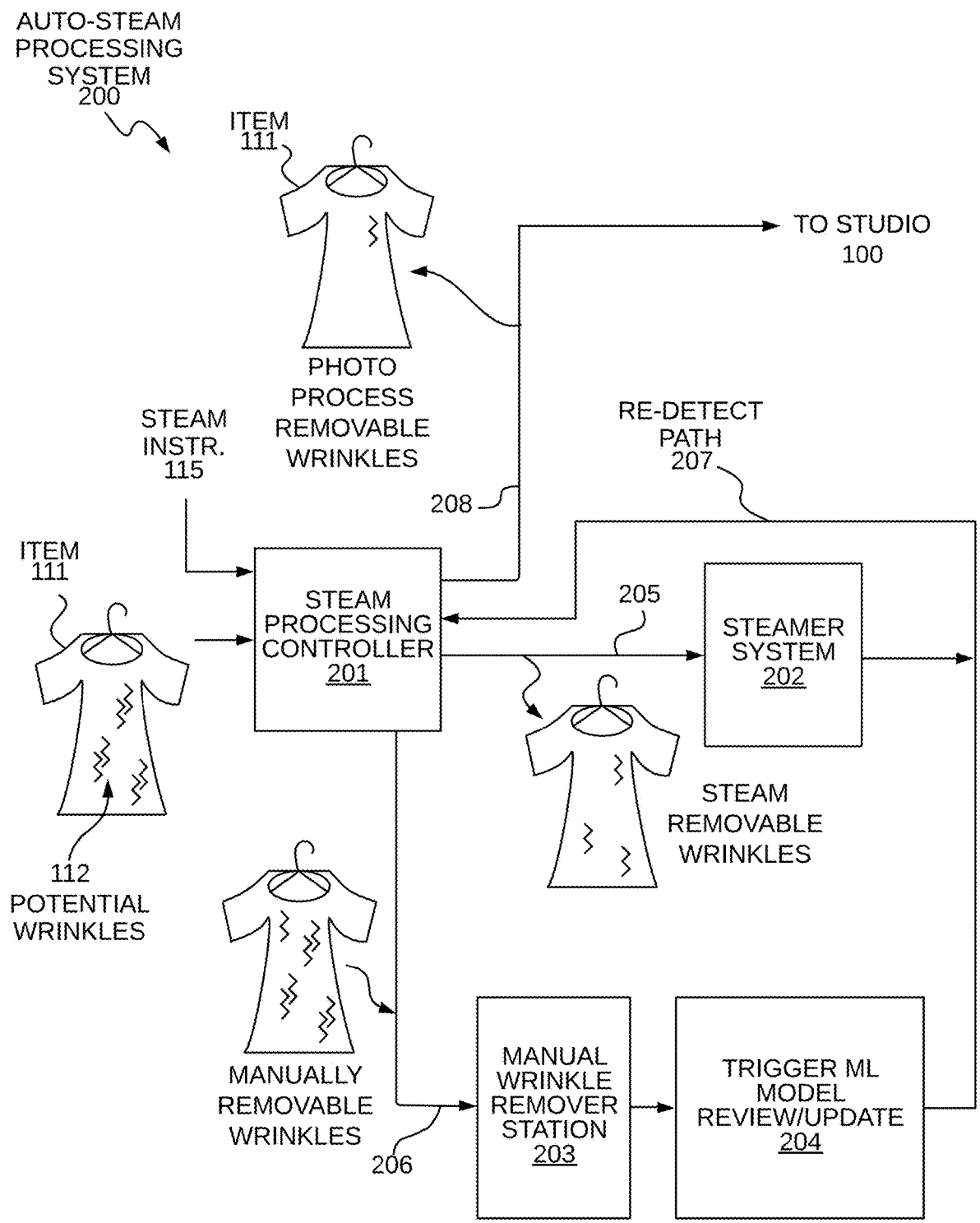
FIG. 2 is a diagram showing an overview of an auto-steam processing system.

FIG. 2 is a diagram showing an overview of an auto-steam processing system 200. For example, in one embodiment, the auto-steam processing system 200 is suitable for use as the auto-steam system 105 shown in FIG. 1.

Manual steam ironing of an item is expensive and takes considerable time to perform. Thus, the auto-steam processing system 200 is configured to automate and standardize item steaming for most items to reduce wrinkles and obtain consistent quality, reduce costs, and save time.

During operation, an item 111 to be steamed is received at a steam processing controller 201. The item 111 is received with steam instructions 115. In one embodiment, the instructions 115 are received from the image processing system 103 shown in FIG. 1. Based on the instructions 115, the controller 201 directs the item to either a steamer system 202 or manual wrinkle remover station 203. When sent to the steamer system 202, as shown by path 205, multiple items are grouped together and each group is placed in a steamer for steaming. The groupings are based on type of material, severity of wrinkles, size of item, and any other suitable item characteristics. After steaming, the items are passed back to the steam processing controller 201. The steaming process for each item may be performed one or more times based on the steam instructions 115 associated with the item 111.

If the wrinkles are more severe, the item is passed to the manual wrinkle remover station 203, as shown by path 206, where an operator uses steam equipment to manually steam the item to remove the severe wrinkles. After the wrinkle removal at block 203, the ML model is triggered at block 204 to review or update the model's performance based on the types of wrinkles, material patterns of the item, or any other feature of the item that affects how the ML model processes the item. The ML model is updated to better recognize and remove wrinkles from items. After the manual steaming process, the items are passed back to the steam processing controller 201, as shown by path 207. The manual steaming process may be performed one or more times for each item based on the steam instructions 115 associated with the item 111.

Once an item has been properly steamed according to the steam instructions for the item, the item is returned to the studio processing system 100 to be photographed by the image processing system 103, as shown by path 208. It should be noted that the item does not have to be wrinkle-free to be returned to the studio processing system 100. The wrinkles of the item only need to be reduced enough so that the wrinkles can be removed during image processing.

Figure 3:
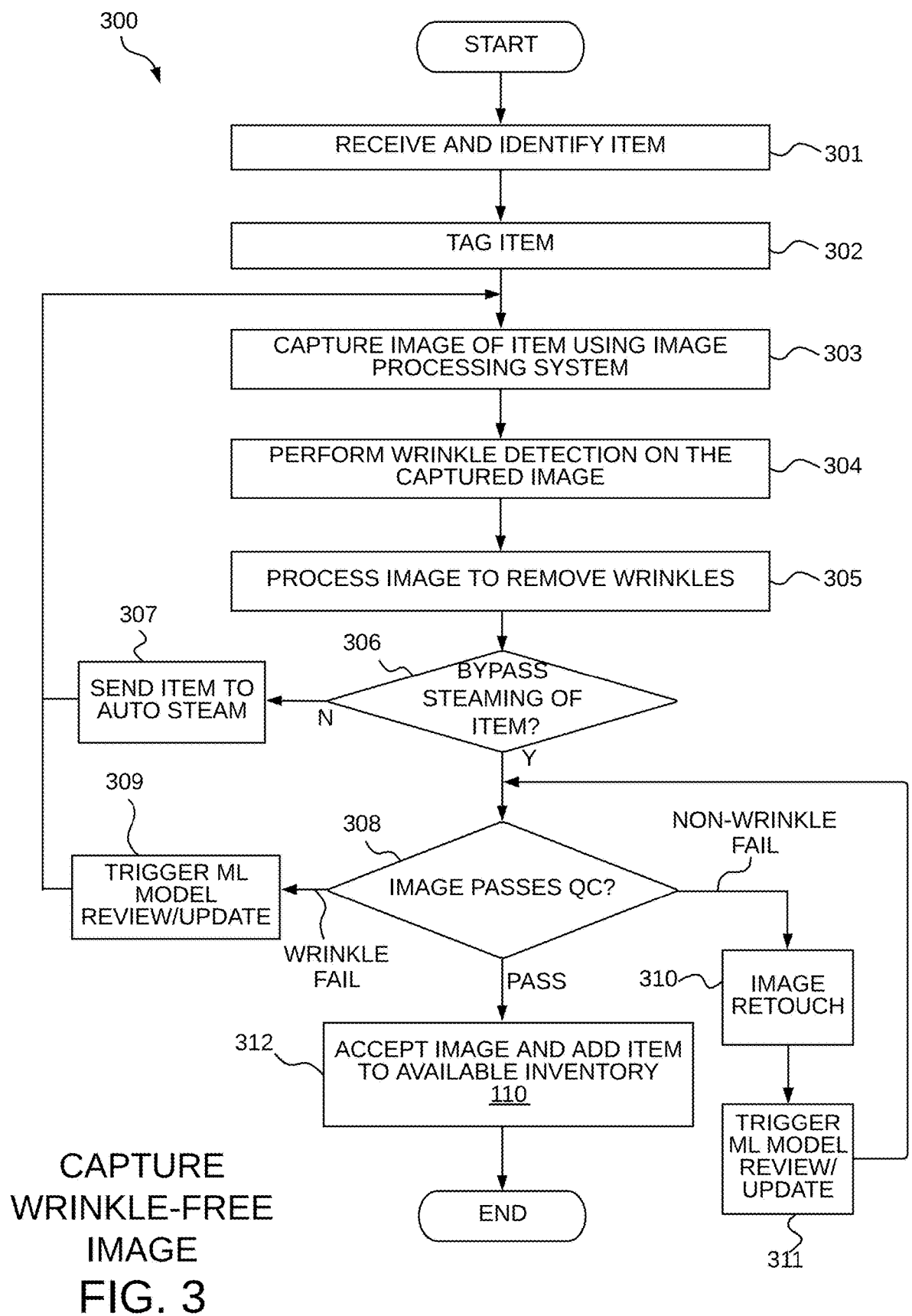
FIG. 3 shows a flowchart of a method for capturing an image of an item for use in creating a PDP.

FIG. 3 shows a flowchart of a method 300 for capturing an image of an item for use in creating a PDP. For example, method 300 is performed by the studio processing system 100 shown in FIG. 1.

At block 301, an item is received and identified. In one embodiment, the receiving center 102 receives the item.

At block 302, the item is tagged with identifying information. In one embodiment, a label, bar code, QR code or other tag is attached to the item that describes various characteristics of the item, such as manufacturer, item type, size, color, material type and/or any other suitable characteristics of the item.

At block 303, an image of the item is captured. The captured image of the item is to be used in creating a PDP of the item. In one embodiment, the image processing system 103 captures the image of the item.

At block 304, wrinkle detection is performed on the captured image of the item. In one embodiment, the image processing system 103 performs wrinkle detection on the item to detect any wrinkles.

At block 305, image processing is performed to remove any detected wrinkles in the image of the item.

At block 306, a determination is made as to whether the processed image is acceptable for use in a PDP. If the processed image is not acceptable, the method proceeds to block 307. If the image is acceptable, the method proceeds to block 308.

At block 307, the item is sent out for auto steaming to remove wrinkles that could not be removed by image processing. When the item returns from the steaming process, the item is passed back to the photographing process at block 303.

At block 308, a determination is made as to whether the image of the item passes a quality control (QC) test. If the image fails the QC test due to excessive wrinkles, the method proceeds to block 309. If the image fails the QC test due to non-wrinkle issues, the method proceeds to block 310. If the image passes the QC test, the method proceeds to block 312.

At block 309, since the image failed QC due to wrinkle issues, the ML model is evaluated and updated to improve the wrinkle removal process. The method then proceeds to block 303 for additional image processing.

At block 310, image retouching is performed to correct the non-wrinkle issues with the image. For example, the non-wrinkle issues include color or contrast adjustment, or any other issues. The method then proceeds to block 311.

At block 311, the ML model is evaluated and updated to improve the non-wrinkle issues. The method then proceeds to block 308 for an additional QC check.

At block 312, the image of the item is accepted and the item is added to the available inventory. The image is used to create a PDP of the item for use in advertising materials.

Thus, method 300 operates to capture an image of an item for use in creating a PDP in accordance with one novel aspect. It should be noted that the operations of method 300 are exemplary and not limiting, and that the operations can be changed, added to, deleted, rearranged, or otherwise modified within the scope of the embodiments.

Figure 4:
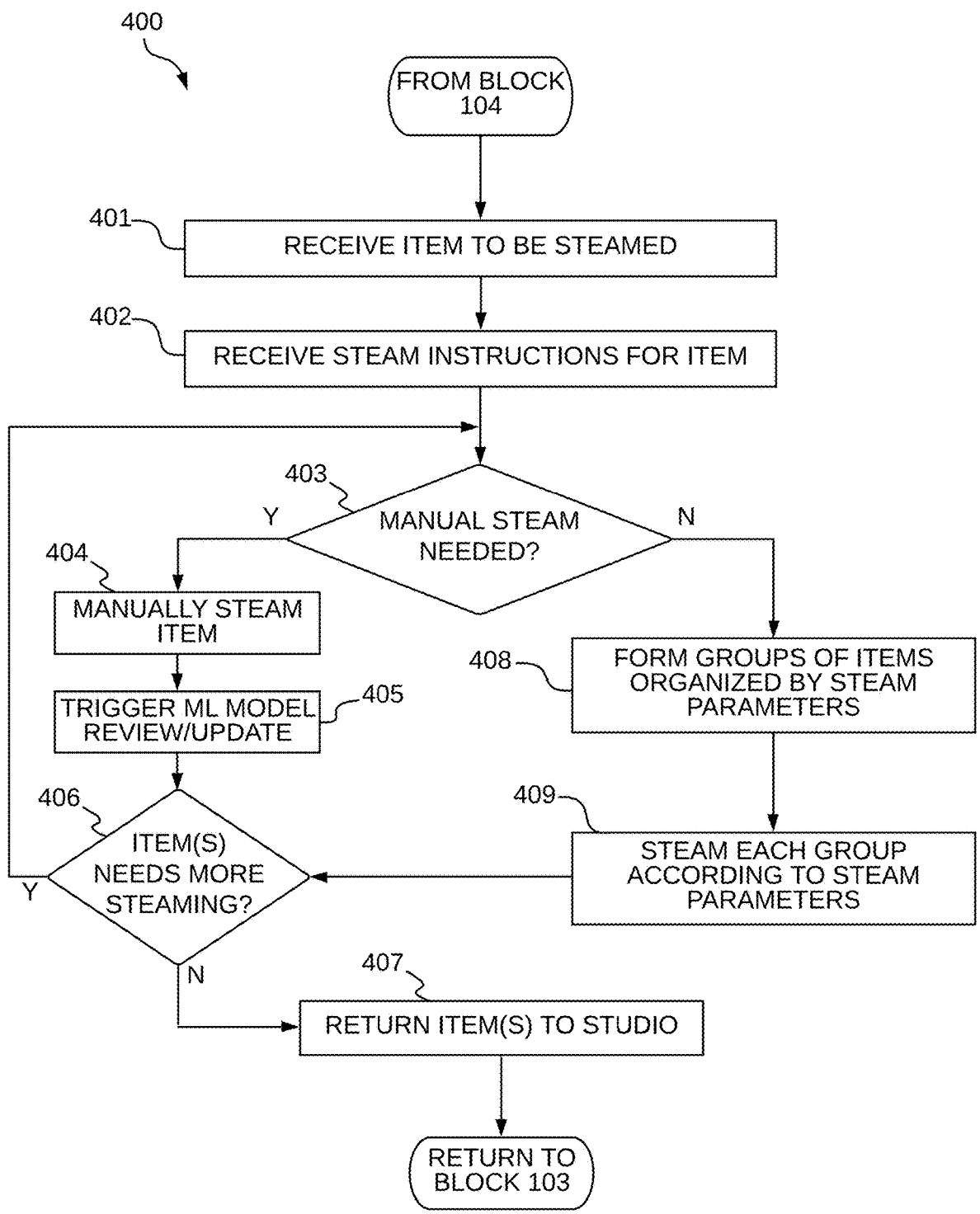
FIG. 4 shows a flowchart of a method for auto-steaming an item in accordance with one novel aspect.

FIG. 4 shows a flowchart of a method 400 for auto-steaming an item in accordance with one novel aspect. For example, method 400 is performed by the auto-steam processing system 200 shown in FIG. 2.

At block 401, an item is received to be physically steamed. In one embodiment, the item 111 is received at the steam processing controller 201 shown in FIG. 2.

At block 402, steam instructions for the item are received. For example, the steam instructions 115 are received at the steam processing controller 201 from the image processing system 103.

At block 403, a determination is made as to whether manual steaming is needed for the received item. In one embodiment, the steam processing controller 201 decodes the steam instructions 115 to determine if manual steam processing is needed for the item. If manual steaming is needed, the method proceeds to block 404. If manual steaming is not needed, the method proceeds to block 408.

At block 404, the item undergoes a manual steaming process. In one embodiment, an operator manually steams the item to remove or reduce any observable wrinkles.

At block 405, the ML model is evaluated and updated to improve the wrinkle removal process. In one embodiment, the operator that performed the manual steaming provides information about the item and the type of wrinkles to the ML model.

At block 406, a determination is made as to whether the item needs more steam processing. In one embodiment, the steam processing controller 201 makes this determination. If the item needs more steam processing, the method proceeds to block 403 to determine if the item needs manual steaming or auto steaming. If the item does not need more steam processing, the method proceeds to block 407.

At block 408, groups of items to be automatically steam processed are formed. For example, the items are grouped by steam parameters, such as steam temperature, steam time, material, or other characteristics of the items in each group. In one embodiment, the grouping criteria are determined from the steam instructions 115.

At block 409, each group of items is steamed according to the steam instructions for those items. For example, a group of items is loaded into a steam box and steams at a selected temperature and time based on the steam instructions. The method then proceeds to block 406.

At block 407, the steamed item is returned to the studio processing system 100. For example, the steamed item is returned from the steam processing controller 201 along path 208 to the image processing system 103 shown in FIG. 1.

Thus, method 400 operates to auto-steam wrinkled items in accordance with one novel aspect. It should be noted that the operations of method 400 are exemplary and not limiting, and that the operations can be changed, added to, deleted, rearranged, or otherwise modified within the scope of the embodiments.

Figure 5:
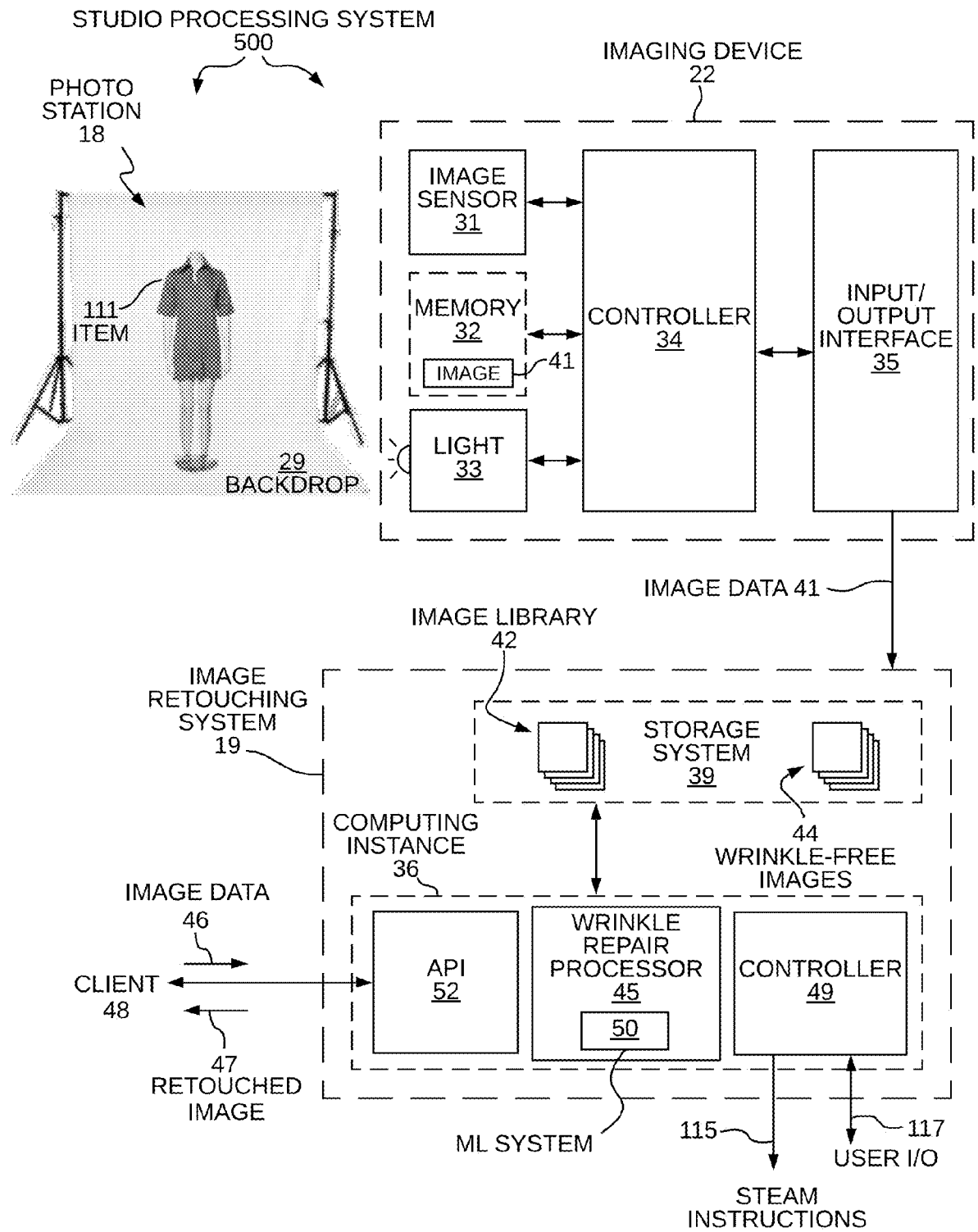
FIG. 5 is a diagram of a studio processing system in accordance with one embodiment.

FIG. 5 is a diagram of a studio processing system 500 in accordance with one embodiment. For example, the studio processing system 500 is suitable for use as the studio processing system 103 shown in FIG. 1. The studio processing system 500 comprises a photography station 18, an imaging device 22, and image retouching system 19.

During operation, an item 111 is placed on a prop or mannequin and is photographed in the photo station 18, for the purpose of obtaining images that can be used to display the item 111 in a PDP or other marketing and advertising materials. The item 111 is displayed on the mannequin before a backdrop 29. The backdrop 29 is used to achieve desirable lighting conditions for photographing the item 111.

The imaging device 22 comprises an image sensor 31, memory 32, light 33, controller 34, and input/output interface 35. The imaging device 22 includes other supporting hardware and software components not shown to simplify explanation. During photographing of item 111, the controller 34 controls image sensor 31 to capture images of item 111 and controls light 33 to provide desired lighting. A captured image 41 is stored in memory 32. The controller 34 communicates the captured image 41 to image retouching system 19 using the input/output interface 35. The input/output interface 35 includes hardware/software for transferring the captured image 41 via a wired or wireless connection to an external system, such as the image retouching system 19.

In one embodiment, the image retouching system 19 comprises a storage system 39 and computing instance 36. The computing instance 36 comprises application program interface (API) 52, wrinkle repair processor 45, and controller 49. The controller 49 comprises any suitable processor capable of interpreting or executing instructions. Storage system 39 is a computer-readable medium that includes any kind of computer memory such as floppy disks, conventional hard disks, CD-ROMS, Flash ROMS, non-volatile ROM, RAM, and non-volatile memory. The API 52 comprises any suitable hardware/software capable of interfacing with external devices, such as a network link or a physical communication bus that allows wired or wireless communications between external devices and various components of the image retouching system 19.

The image retouching system 19 receives the image data 41 from the interface 35 and stores the image data 41 in an image library 42 of the storage system 39. The image retouching system 19 can also receive image data 46 through the API 52 and store the image data 46 in the image library 42.

The wrinkle repair processor 45 comprises a machine learning (ML) system 50 that is configured to dynamically retouch unretouched images stored in the image library 42. For example, the ML system 50 operates to detect wrinkles in the image of the item 111 and to remove or reduce the visibility of detected wrinkles in the image. The processed wrinkle-reduced images are stored as wrinkle-free images 44 in the storage system 39. The processed wrinkle-free images 44 can also be provided through the API 52 as retouched images 47.

If the ML system 50 is unable to adequately remove detected wrinkles in the item, the controller 49 outputs steam instructions 15 associated with the item. The steam instructions 15 are used to auto-steam the item when the severity of the wrinkles in the item does not allow removal by image processing methods. Following the auto steam process, the item is returned to the photo station so that another image can be captured and processed. In one embodiment, the controller 49 also provides a user interface to send and receive user I/O 117.

In the embodiment shown in FIG. 5, the computing instance 36 and the storage system 39 are integrated into the image retouching system 19. It is understood that in another embodiment, one or more of the computing instance 36 or the storage system 39 is distributed across a network as part of a distributed system architecture. For example, the computing instance 36 can be one or more cloud computing instances, and the storage system 39 can be cloud storage operating in a cloud environment. In one embodiment, the machine learning system 50 is a computational structure that is stored partly or entirely in storage system 39.

Figure 6:
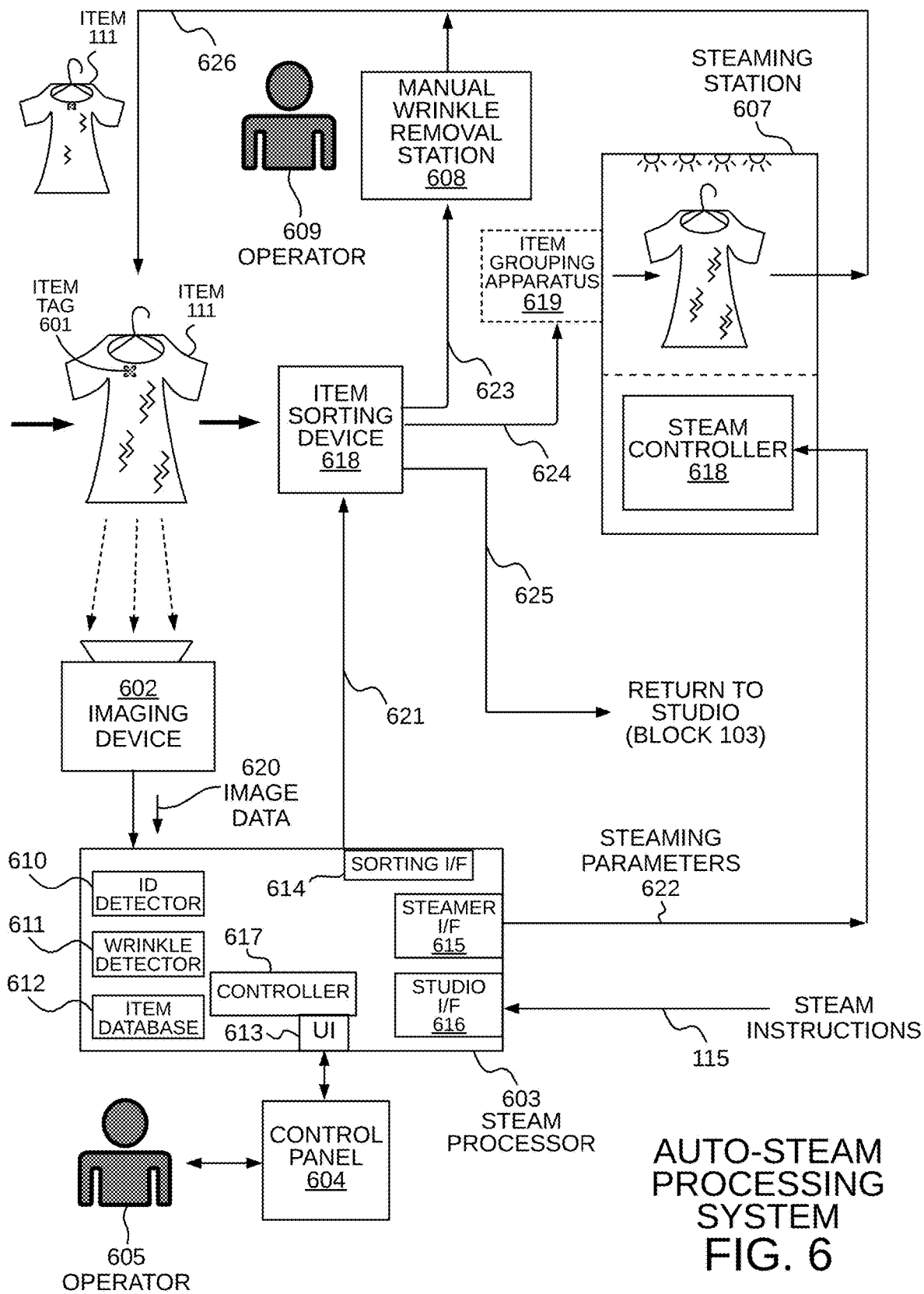
FIG. 6 shows another embodiment of an auto-steam processing system.

FIG. 6 shows another embodiment of an auto-steam processing system. The auto-steam processing system shown in FIG. 6 is suitable for use as the auto steam system 105 shown in FIG. 1.

In one embodiment, the auto-steam processing system comprises imaging device 602, steam processor 603, sorting device 606, steaming station 607, and wrinkle removal station 608.

During operation, the item 111 to be steamed is received and the imaging device 602 captures image data 620 of the item. The item 111 includes an item tag 601 that identifies the item and provides a variety of information about the item. The image data 620 is received by the steam processor 603.

The steam processor 603 comprises identity detector 610, wrinkle detector 611, item database 612, sorting interface 614, steamer interface 615, studio interface 616, user interface (UI) 613, and controller 617.

The image data 620 is processed by the ID detector 610 to identify the item 111 and its associated characteristics. Information about the item 111 is maintained in the item database 612 based on the detected identity of the item. The wrinkle detector 611 processes the image data 620 to detect the severity of wrinkles in the item. For example, the item may have only a limited number of minor wrinkles, or the item may have one or more very severe wrinkles. Information about the types and number of detected wrinkles are maintained in the item database 612 and are associated with the item identity.

The steam processor 603 also receives the steam instructions 115 from the image processing system 103 shown in FIG. 1. The steam instructions 115 provide additional information as to the conditions under which the item 111 is to be steamed. The steam instructions are stored with the item information in the item database 612.

An operator 605 provides user input through a control panel 604 to communicate information with a user interface 613 of the steam processor 603. The operator 605 is able to control various aspects of the auto-steam processing system through the user input.

The controller 617 obtains wrinkle information about the item from the item database 612 and determines whether the item requires manual wrinkle removal or steaming using the steaming station 607. For example, if the information in the item database indicates that the item is severely wrinkled, the controller 617 communicates with the item sorting device 606 using the sorting interface 614 to send the item to the manual wrinkle removal station 608. For example, control instructions are sent over path 621 to the item sorting device 606 to direct the item along path 623 to the manual wrinkle removal station 608. An operator 609 operates the station 608 to manually remove severe wrinkles from the item. The item is then returned along path 626 to the receiving area where additional images of the item may be captured. The item is returned with no or less wrinkles than when it was directed to station 608.

If the information in the item database 612 indicates that the item is not severely wrinkled, the controller 617 communicates with the item sorting device 606 using the sorting interface 614 to send the item to the steaming station 607. For example, control instructions are sent over path 621 to the item sorting device 606 to direct the item along path 624 to the steaming station 607. In one embodiment, the steaming station 607 comprises an item grouping apparatus 619 that groups similar items together so that these grouped items can be steamed at the same time. In one embodiment, the controller 617 receives the steam instructions 115 and uses these instructions to generate steaming parameters 622 that describe how the item is to be steamed by the steaming station 607. For example, the steaming parameters 622 indicate information such as steaming time, temperature, humidity, and any other steaming parameters that can be used to control how the item is steamed. Some types of garment material are heat sensitive and steaming for long durations and/or high temperatures might cause damage. Price, rarity, provenance, or brand of garments may also influence how garments are steamed. The steaming station 607 also comprises a steam controller 618 that receives the steaming parameters 622 and controls the steaming operation of the item in accordance with the steaming parameters 622. The steam controller 618 also controls the grouping apparatus 619 to group items of the same type and/or items to be steamed using the same steaming parameters so that they can be steamed at the same time. Thus, the steaming station 607 operates to steam multiple items at the same time.

After steaming, each item is then returned along path 626 to the receiving area where additional images of the item may be captured. The item is returned with no or less wrinkles than when it was directed to steaming station 607.

When the controller 617 determines that an item has no wrinkles or only minor wrinkles that can be removed using image processing techniques, the controller 617 controls the sorting device 606 to direct the item along path 625 back to the studio, which in one embodiment is block 103 shown in FIG. 1.

Thus, the auto-steam processing system shown in FIG. 6 can manually or auto steam an item one or more times until the item is suitable for image capture by the studio at block 103 in FIG. 1. The item database 612 keeps track of the steaming processes applied to the item. In one embodiment, multiple items are grouped together for simultaneous steaming at the steaming station 607.

Figure 7:
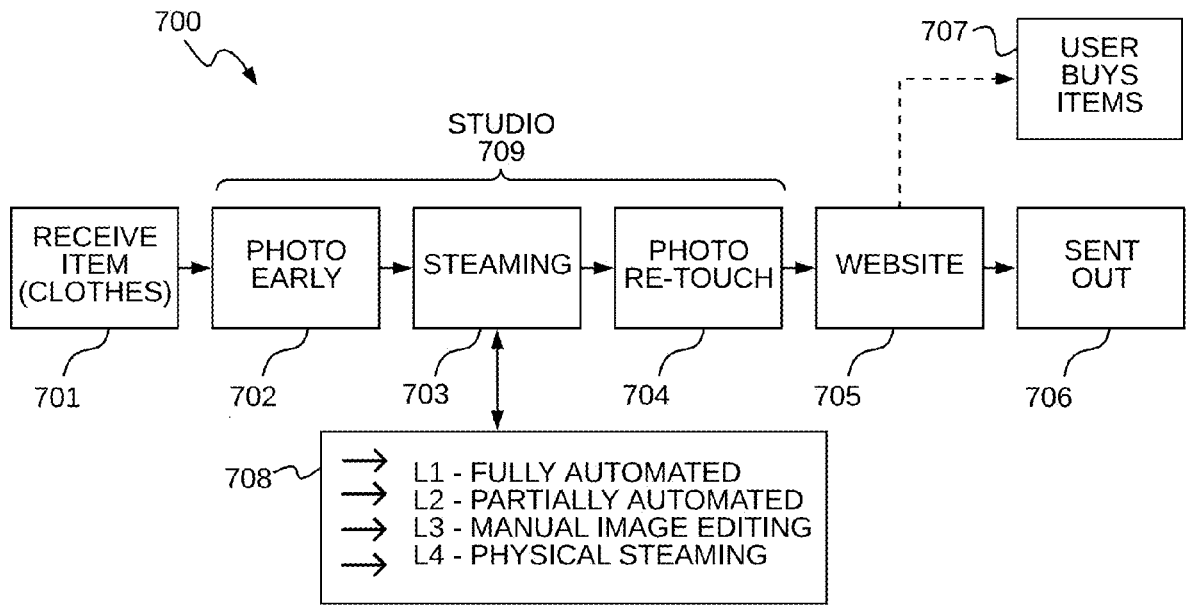
FIG. 7 is an overview of an item processing pipeline in accordance with embodiments of the invention.

FIG. 7 is an overview of an item processing pipeline 700 in accordance with embodiments of the invention. The item processing pipeline 700 operates to remove garment wrinkles either through image processing or auto-steaming.

At block 701, the pipeline begins with an item being received. In one embodiment, the item is an article of clothing or a garment that may have wrinkles as a result of packing and shipping.

At block 702, a photo or image of the item is captured. In one embodiment, the image is captured by the imaging device 22 shown in FIG. 5.

At block 703, a steaming process is performed to remove detected visible wrinkles from the image. In one embodiment, the wrinkle repair processor 45 performs this operation. To remove wrinkles, various operations are performed as illustrated in block 708. For example, as illustrated at block 708, the steaming operations are performed using (L1) full automation, (L2) partial automation, (L3) manual image processing, or (L4) physical steaming.

At block 704, the image with the wrinkles removed is retouched to generate a final image. In one embodiment, the operations 709 that are performed at blocks 702, 703, and 704 are performed by the studio processing system 100 shown in FIG. 1.

At block 705, a PDP of the item is created using the final retouched image, and the PDF is published on a website.

At block 707, a buyer views the PDP on the website and purchases the item.

At block 706, the purchased item is sent to the buyer.

Figure 8:
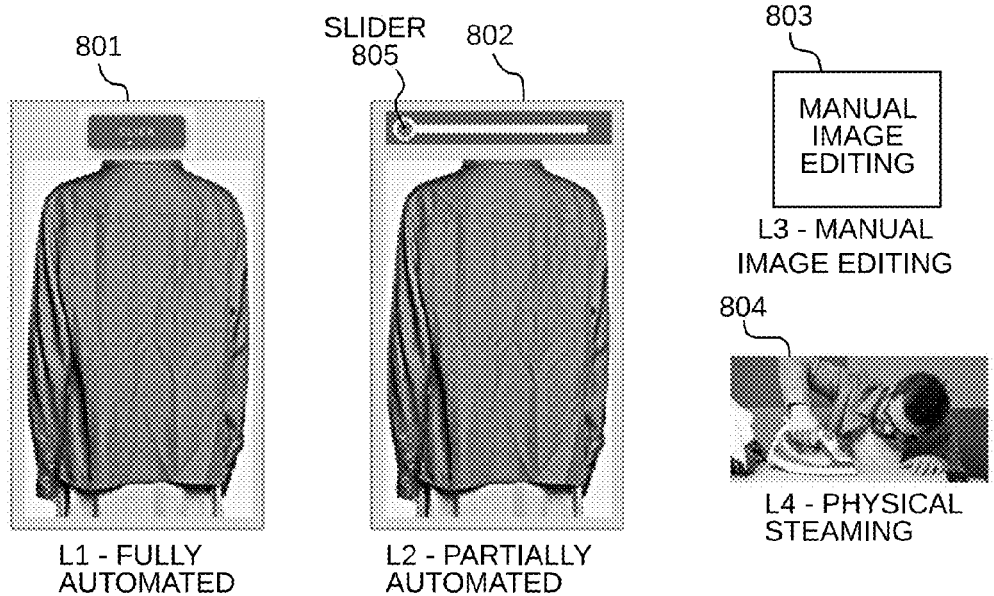
FIG. 8 is an overview of a user interface for wrinkle removal in accordance with a novel aspect.

FIG. 8 is an overview of a user interface for selecting a wrinkle removal process in accordance with a novel aspect. For example, at block 708 shown in FIG. 7, a wrinkle removal process is selected by a user. The wrinkle removal process is selected through a user interface. As shown at block 801, a user interface to select fully automated wrinkle removal is provided. As shown at block 802, a user interface to select partially automated wrinkle removal is provided. In this user interface, a slider 805 is provided that allows a threshold value to be selected. As shown at block 803, a manual image processing interface to manually process an image for wrinkle removal is provided. For example, in one embodiment, image processing software, such as Photoshop®, is selected to manually proceed an image of an item to remove wrinkles. At block 804, a user interface to select a physical steaming process is selected to physically remove wrinkles from the item.

Figure 9:
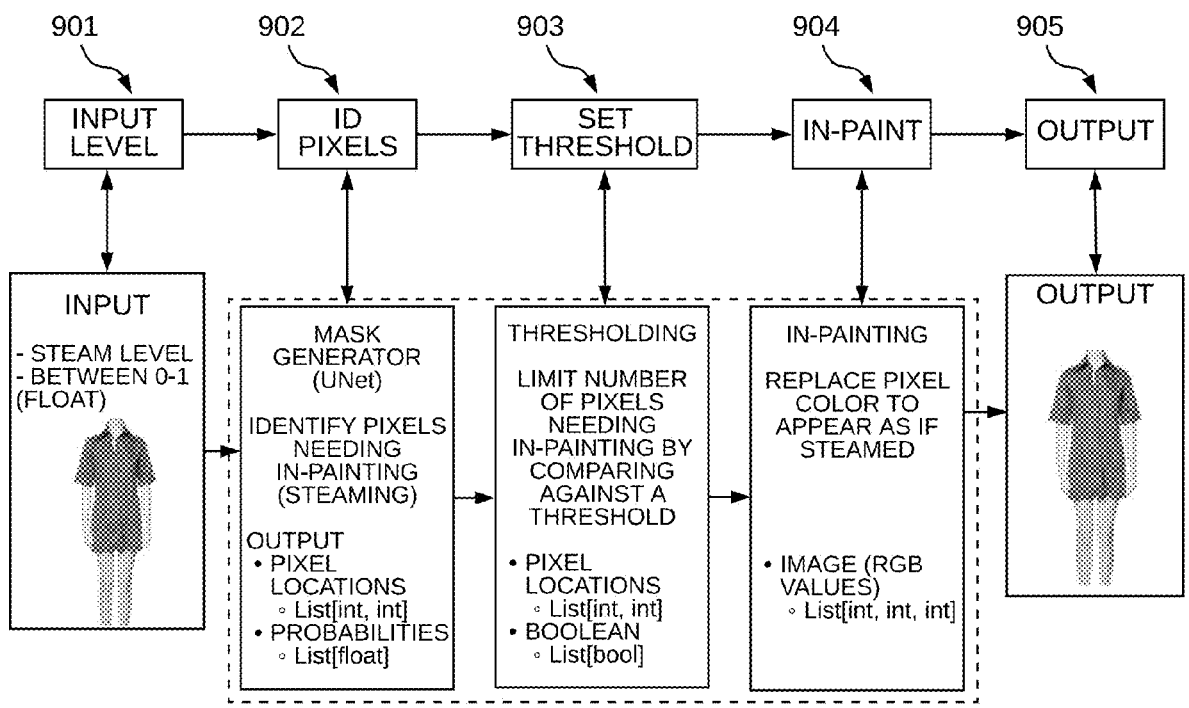
FIG. 9 is an overview of a machine-learning model for wrinkle removal in accordance with a novel aspect.

FIG. 9 is an overview of a machine learning model for wrinkle removal in accordance with a novel aspect. For example, a machine learning model can be used for partial automation of wrinkle removal.

At block 901, a steam level input is entered. In one embodiment, the input is a value between zero (0) to one (1).

At block 902, pixels are identified that require in-painting for wrinkle removal. In one embodiment, a mask generator comprising a convolutional neural network (CNN) is used to identify the pixels. In this example, the CNN is realized using a U-Net model architecture.

At block 903, a threshold is set that will limit the number of identified pixels needing in-painting.

At block 904, in-painting is performed to replace pixel color for the limited number of pixels so as to appear steamed (e.g., wrinkle removed).

At block 905, a wrinkle-removed image is output.

Figure 10:
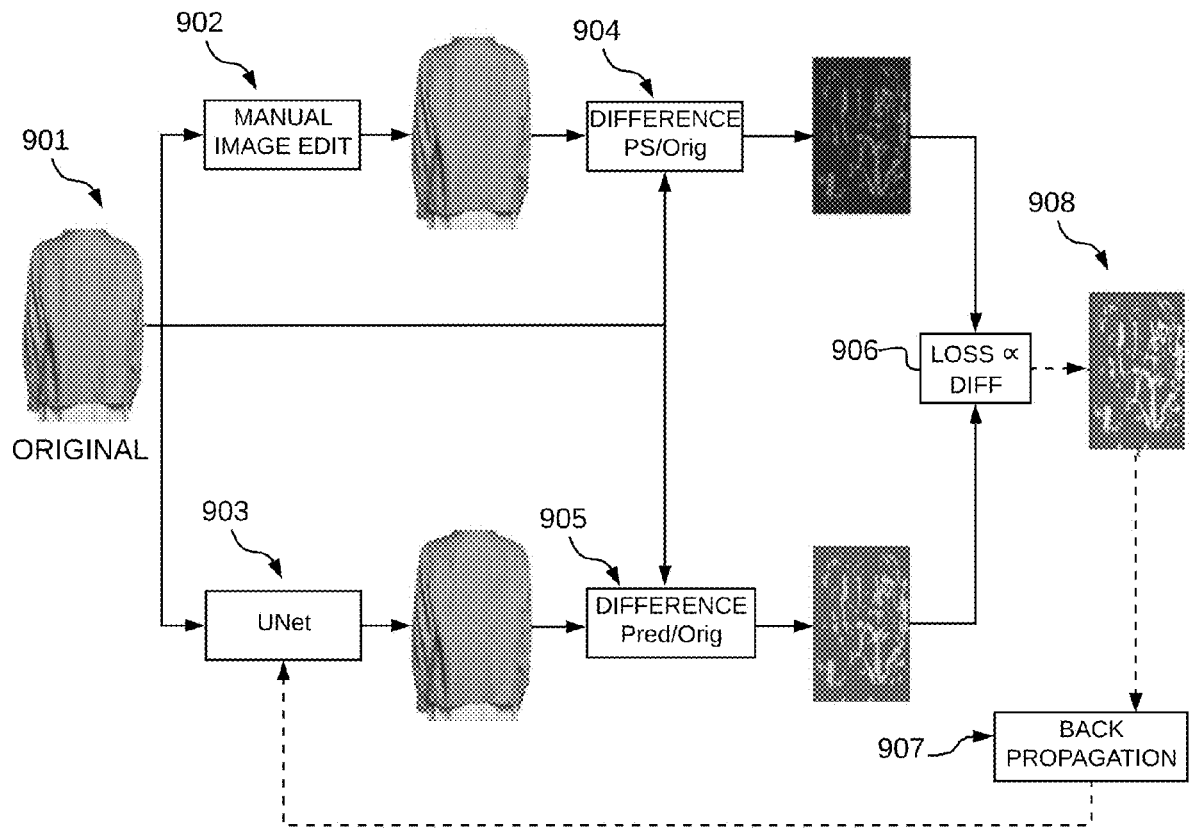
FIG. 10 is an overview for training a UNET wrinkle detector in accordance with a novel aspect.

FIG. 10 is an overview for training a U-Net model to generate a mask in accordance with a novel aspect. An image 901 is input to the training system. The image 901 undergoes manual image editing 902, using tools such as Photoshop®, and UNET processing 903 to generate two additional images. The image 901 is subtracted from the manually edited image at block 904. The image 901 is subtracted from the UNET-generated image at block 905. At block 906, the difference images are further subtracted to generate a resulting image 908. A back propagation function 907 is used to update the UNET processing 903.

Figure 11:
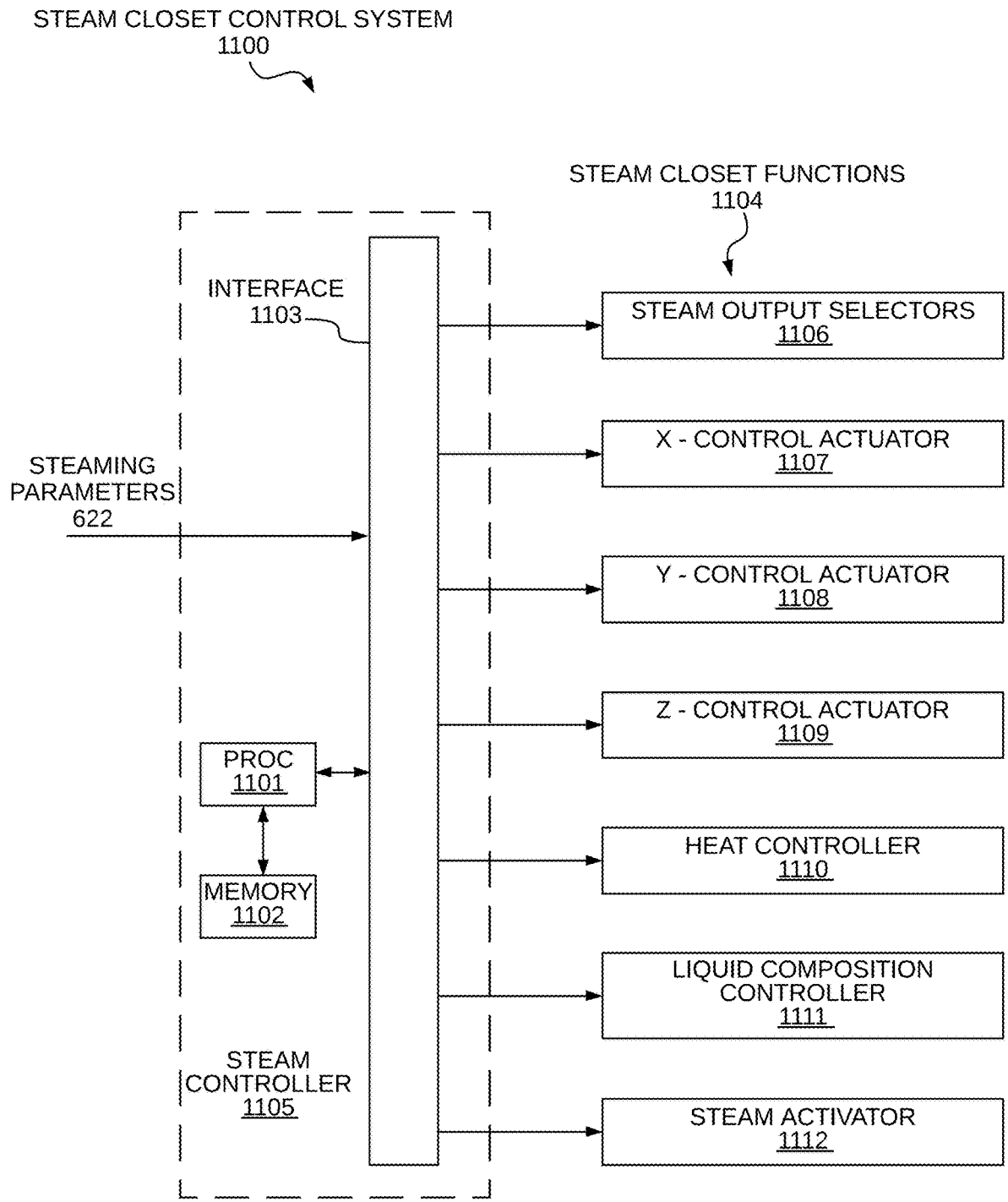
FIG. 11 shows an embodiment of a steam closet control system.

FIG. 11 shows an embodiment of a steam closet control system 1100. For example, the steam closet control system 1100 is suitable for use with the steaming station 607 shown in FIG. 6. The control system 1100 comprises a steam controller 1105 that includes processor 1101, memory 1102, and interface 1103. The interface 1103 is coupled to control a plurality of steam closet functions 1104. In one embodiment, the steam closet functions include steam output selectors 1106, X-control actuator 1107, Y-control actuator 1108, Z-control actuator 1109, heat controller 1110, liquid composition controller 1111, and steam activator 1112.

During operation, steaming parameters 622 associated with each item are received by the interface 1103 and passed to the processor 1101. For example, the steaming parameters 622 are output from the steam interface 615 of the steam processor 603 (see FIG. 6). Based on the steaming parameters 622, the processor 1101 controls the steam closet functions to steam one or more items. For example, the processor 1101 is configured to control the X-control actuator 1107, Y-control actuator 1108, and Z-control actuator 1109 of the steam closet and steam output selectors 1106. The processor 1101 is also configured to control heat controller 1110, liquid composition controller 1111, and steam activator 1112. Thus, all the functions of the steam closet are controllable by the processor 1101 based on the received steaming instructions 622.

Figure 12:
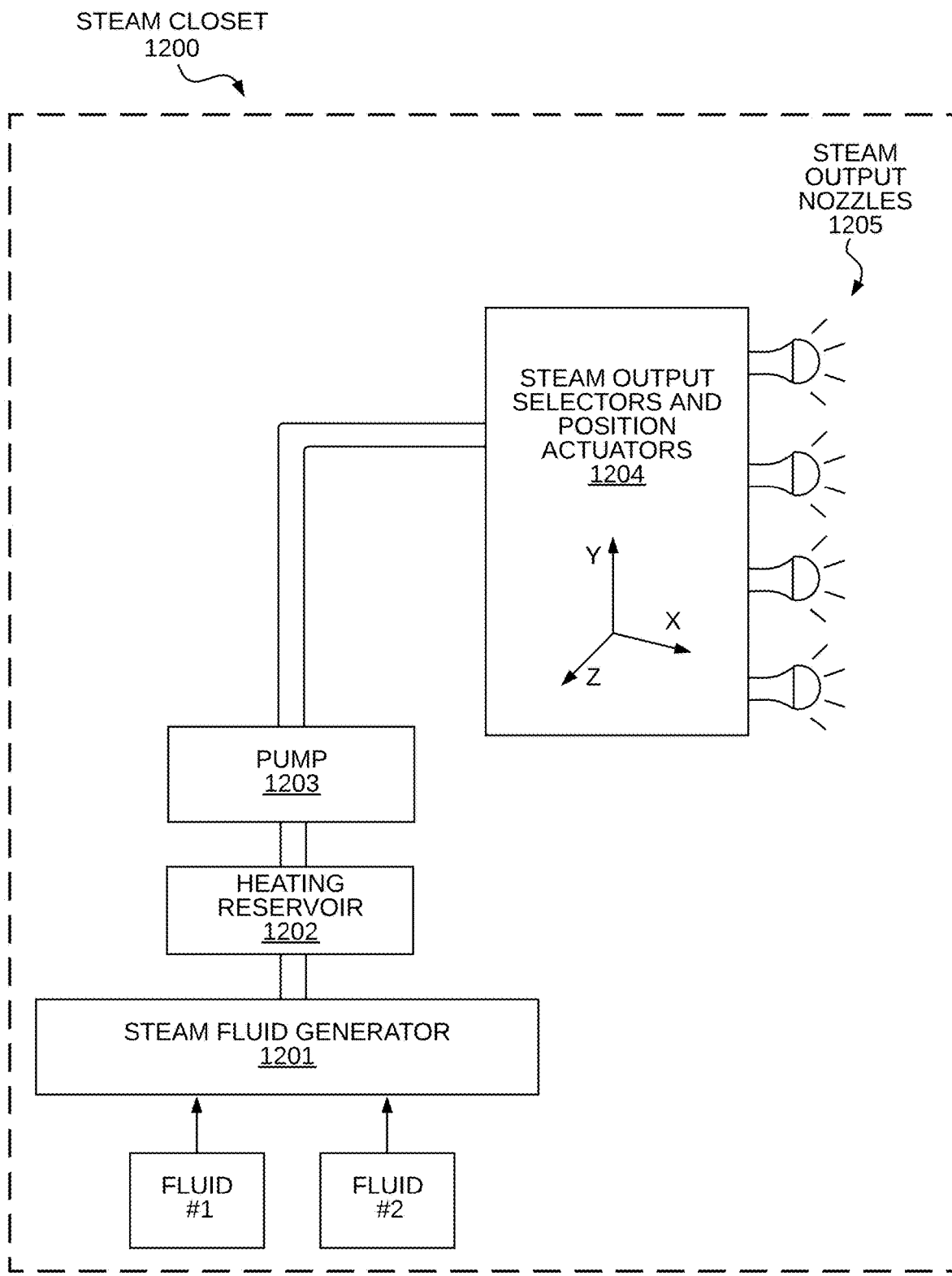
FIG. 12 shows an embodiment of a steam closet that is configured to steam one or more items based on associated steaming parameters.

FIG. 12 shows an embodiment of a steam closet 1200 that is configured to steam one or more items based on associated steaming parameters. The steam closet 1200 comprises steam fluid generator 1201, heating reservoir 1202, pump 1203, and steam output selectors and actuators 1204, which drive steam output nozzles 1205.

The operation of the steam closet 1200 is controlled by the steam closet control system 1100 shown in FIG. 11. During operation, the liquid composition controller 1111 controls the steam fluid generator 1201 to combine a first fluid (FLUID #1) and a second fluid (FLUID #2) in any combination to generate a steam fluid that is stored in the heating reservoir 1202. The heat controller 1110 controls the heat reservoir 1202 to heat the steam fluid to a desired temperature. The steam activator 1112 controls the pump 1203 to pump the heated fluid to the output selectors and actuators 1204, which emit the heated fluid as steam through the output nozzles 1205.

Figure 13:
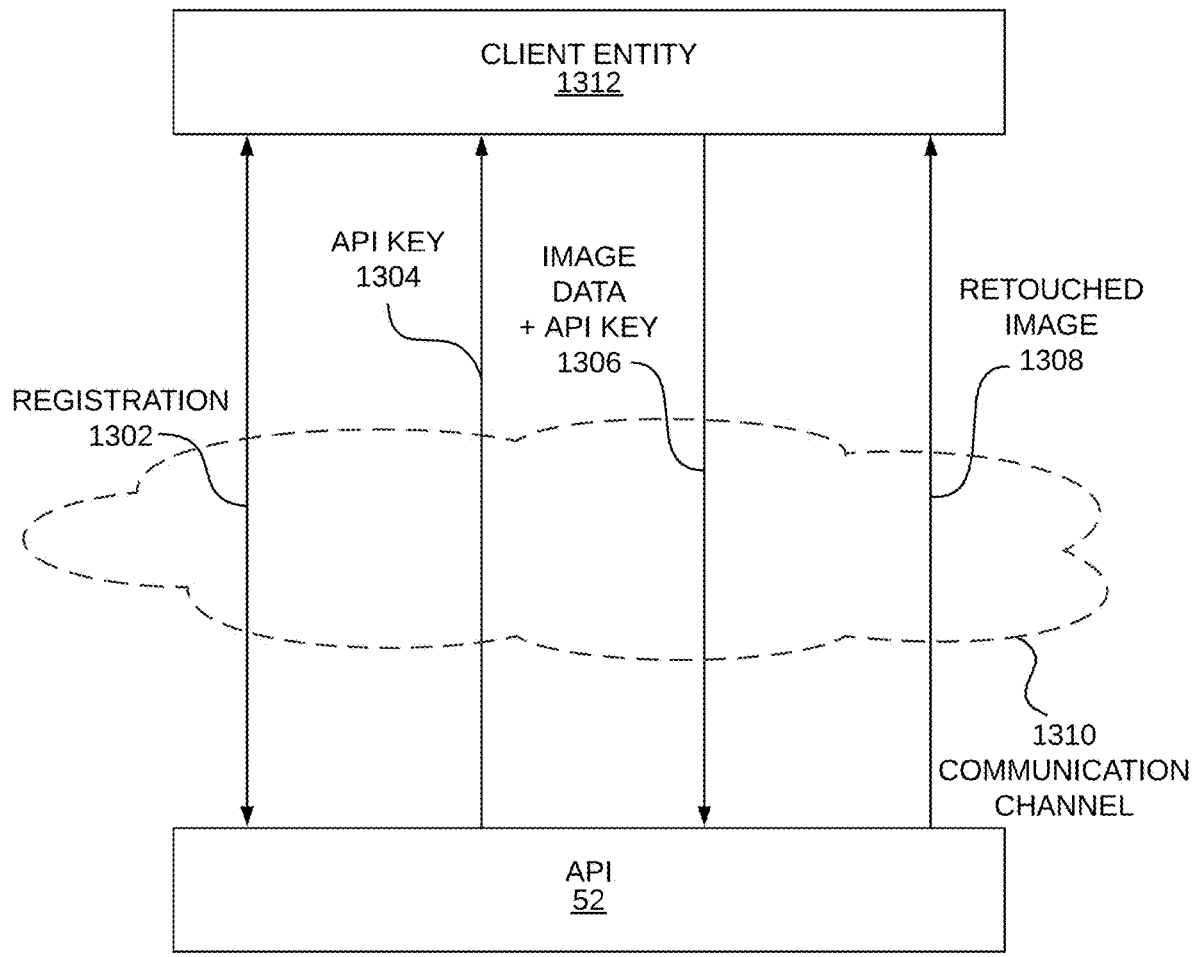
FIG. 13 is a diagram for API access to an image retouching system in accordance with a novel aspect.

FIG. 13 is a diagram showing client access to an image retouching system in accordance with a novel aspect. For example, the computing instance 36 shown in FIG. 5 uses the API 52 to receive image data 46 from an external client 48 and then generates a retouched image 47 in accordance with the various disclosed embodiments that is returned back to the client 48.

Referring now to FIG. 13, a client entity 1312 communicates with API 52 over a communication channel 1310 to register 1302 and receive authentication keys 1304 to enable communication with the system.

The client 1312 provides image data 1306 to the API 52 using the provided keys. In one embodiment, the API 52 passes the received image data to the wrinkle repair processor 45, which performs image retouching as disclosed herein to generate a retouched image. The retouched image 1308 is then transmitted to the client device 1312 as shown in FIG. 13.

Figure 14:
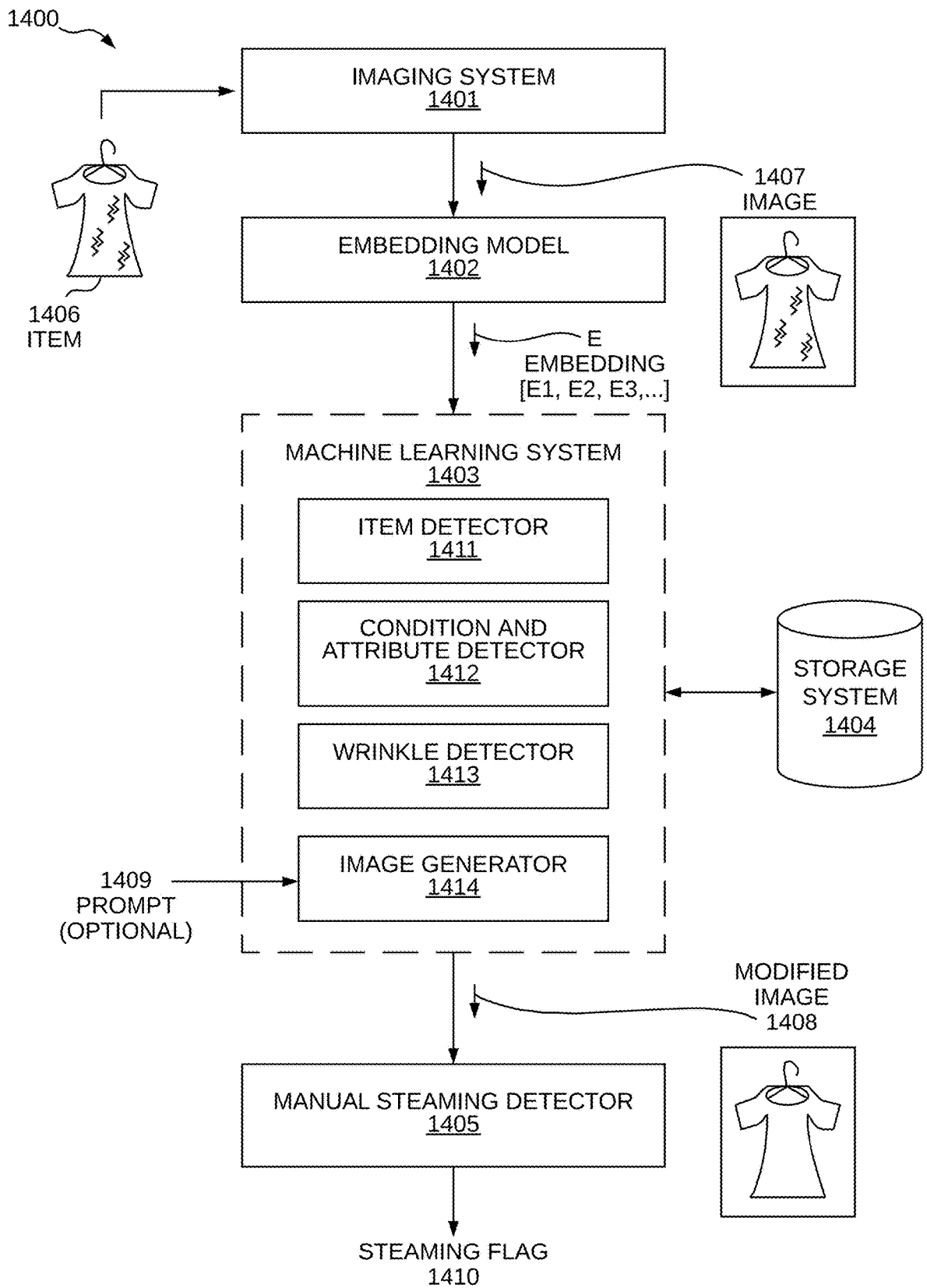
FIG. 14 is a diagram of an automated steam processing system 1400 in accordance with another embodiment.

FIG. 14 is a diagram of an automated steam processing system 1400 in accordance with another embodiment. The automated steam processing system 1400 includes an imaging system 1401, an embedding model 1402, a machine learning system 1403, a storage system 1404, and a manual steaming detector 1405. Upon receiving a new item 1406, the imaging system 1401 is used to obtain and generate an image 1407 of the item 1406. The machine learning system 1403 uses the image 1407 to predict item and item type, condition, attributes, and care information from item tags. Parts of the automated steam processing system 1400 are realized as a standalone system or as a plug-in, extension, or application wrapper. For example, in various embodiments, parts of the automated steam processing system 1400 are implemented as a plug-in or extensions for Adobe® Photoshop® used by intake infrastructure in a resale marketplace setting allowing photographers to modify wrinkles of image (s) taken at intake.

Predicted condition and item attributes assist machine learning system 1403 with predicting whether a certain pixel of the item is a wrinkle or whether the pixel represents another feature inherent to the garment that is an integral part of the garment (e.g., style of fabric or weave) or applied (e.g., stain or damage) that is not to be modified. Non-wrinkle pixels are not modified to ensure that customers are seeing the true state of the item. To reduce return risk, the modified image is accurate and correctly depicts the state and condition of the item. Wrinkles may be removed by the machine learning system 1403 to improve merchantability in resale marketplaces, but details pertinent to an average consumer are not obstructed or obscured thereby preserving resale market integrity and reducing return probability.

The image 1407 of the item 1406 is supplied to the embedding model 1402. The embedding model 1402 receives the image 1407 and generates an embedding "E". The embedding "E" is a numerical representation of the image 1407. The machine learning system 1403 receives the embedding "E" and generates a modified image 1408.

The machine learning system 1403 comprises an item detector 1411, a condition and attribute detector 1412, a wrinkle detector 1413, and an image generator 1414. The wrinkle detector 1413, described in connection with previous figures, predicts wrinkles information from the embedding E. The wrinkle detector 1413 optionally uses item information generated by item detector 1411 using stored item information in storage system 1404 to more accurately predict whether a pixel is a wrinkle or a feature of the item 1406. In other embodiments, the machine learning system 1403 does not include the item detector 1411 in predicting pixels pertaining to wrinkles that require smoothing. The item detector 1411 compares embedding "E" to stored embeddings in storage system 1404, such as via cosine similarity, to identify similar items.

For additional information on the item detector 1411, including how to construct and use the item detector 1411 to identify similar previously stored inventory, see: (1) U.S. patent application Ser. No. 17/815,836, entitled "Generating Descriptions Of Items From Images And Providing Interface For Scalable Review Of Generated Descriptions," filed on Jul. 28, 2022, by Cheema et al.; (2) U.S. Patent Application Ser. No. 17/863,287, entitled "Outfit Recommender System," filed on Jul. 12, 2022, by Brossman et al.; (3) U.S. Patent Application Ser. No. 18/403,304, entitled "Automated Attribution Based On Historical Data," filed on Jan. 3, 2024, by Ramdasi et al.; (4) U.S. Patent Application Ser. No. 18/441,266, entitled "Image Based Real-Time Inventory Search System," filed on Feb. 14, 2024, by Cheema et al. (the entire subject matter of the above identified patent documents is hereby incorporated by reference).

The wrinkle detector 1413 also optionally uses condition and attribute information generated by the condition and attribute detector 1412 to more accurately predict whether a pixel is a wrinkle or a feature, wear, or damage of the item 1406. In other embodiments, the machine learning system 1403 does not include the condition and attribute detector 1412 in predicting pixels pertaining to wrinkles that require smoothing. For additional information on the condition and attribute detector 1412, including how to construct and use the condition and attribute detector 1412, see: (1) U.S. Patent Application Ser. No. 18/617,577, entitled "Automated Item Attribution And Condition Detection System," filed on Mar. 26, 2024, by Lynes et al.; and (2) U.S. Patent Application Ser. No. 18/398,080, entitled "Automated Extraction of Product Data From Tags," filed on Dec. 27, 2023, by Cheema et al. (the entire subject matter of the above identified patent documents is hereby incorporated by reference).

The image generator 1414 is any suitable structure capable of generating images from a prompt, images, or other inputs. The image generator 1414 optionally receives a prompt 1409 that is used in generating the modified image 1408. The prompt 1409 is text data, image data, video data, audio data, a combination of text, image, video, or audio data, or any other suitable input capable of being processed by image generator 1414. The image generator 1414 generates and outputs a modified image 1408 with reduced wrinkles as compared to image 1407 of the received item 1406.

In one example, the image generator 1414 includes a Generative Adversarial Network (GAN), other machine learning techniques usable in generating images, or commercially available models such as DALL-E, DALL-E 2, or DALL-E 3 provided by OpenAI®, Gemini provide by Google®, or DreamStudio provided by Stability AI®. For additional information on how to implement a GAN to generate images, see: U.S. Patent Application Ser. No. 18/296,251, entitled "Automated Retouching Of Studio Images," filed on Apr. 5, 2023, by Ramdasi et al. (the entire subject matter of this patent document is hereby incorporated by reference).

Next, the modified image 1408 is supplied to a manual steaming detector 1405. The manual steaming detector 1405 analyzes the modified image 1408 and determines whether manual steaming is desirable or whether the modified image 1408 is acceptable. The manual steaming detector 1405 outputs a steaming flag bit 1410. The steaming flag bit 1410 indicates whether manual steaming will be requested. In one embodiment, the manual steaming detector 1405 is a machine learning model trained on many labeled input images requiring manual steaming and many labeled input images that do not require manual steaming.

FIG. 15 is a diagram of an image to image model 1500 usable by the automated steam processing system 1400 in generating modified images with reduced wrinkles. The image to image model 1500 receives an input image 1501 and generates an output image 1502. The input image 1501 is used to generate modified image 1502 with wrinkles removed. Generated image intermediates are fine grained, step iterations across a wrinkle removal smoothing process, from no wrinkle removal modifications to full smoothed image with all wrinkles removed. The image intermediates are presented to operators via interface 802 and slider 805 shown in FIG. 8.

In some embodiments, image intermediates are generated using machine learning. Visual interference might challenge the ability of machine learning models to generate accurate, wrinkle-removed images. For example, moiré interference patterns or shadows are identified by the operator and cause the operator to trigger a manual process to avoid undesirable interference issues and further train machine learning models.

FIG. 16 is a diagram of a text to image model 1600 usable by the automated steam processing system 1400 in generating modified images with reduced wrinkles. The image to image model 1600 receives an input image 1601 and generates an output image 1602.

FIG. 17 is a diagram of one example of the prompt 1601 supplied to the text to image model 1600 in generating modified image 1602 with reduced wrinkles.

Figure 18:
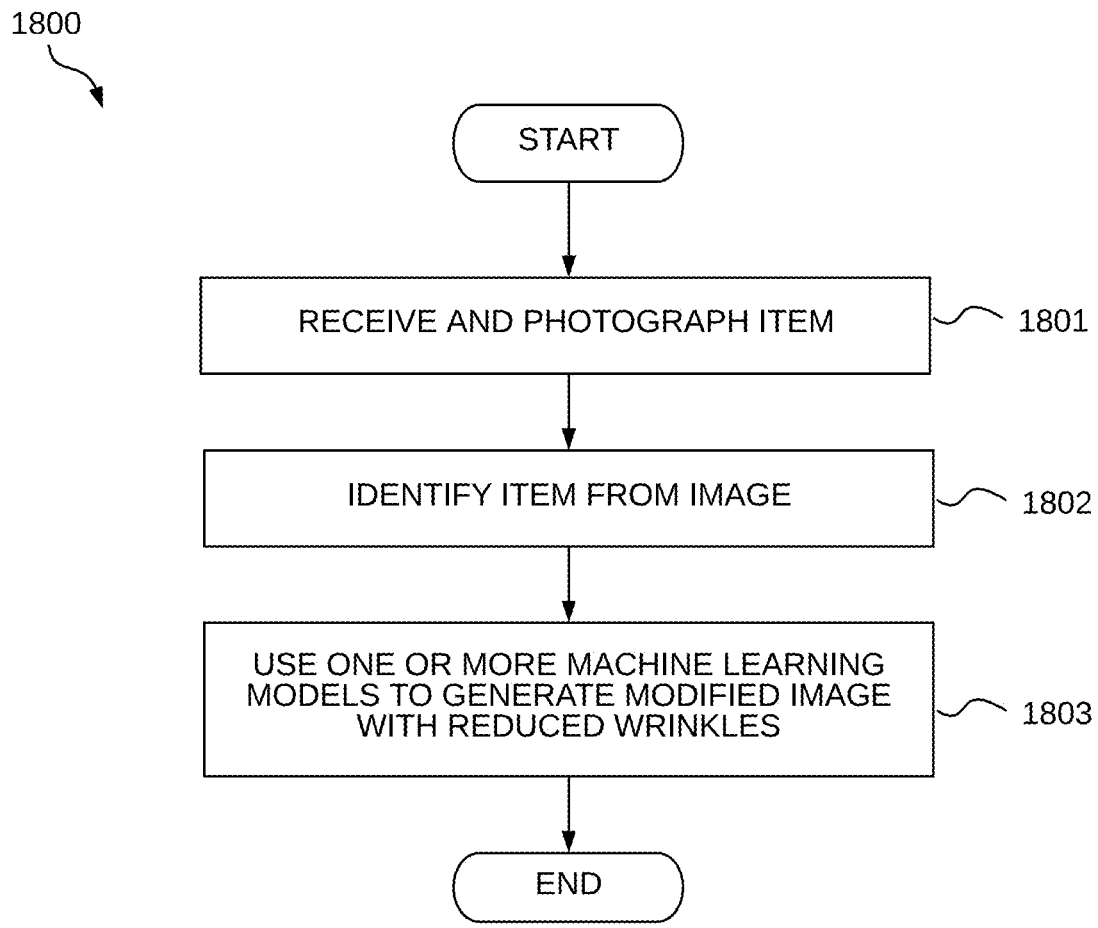
FIG. 18 is a flowchart of a method 1800 in accordance with another novel aspect.

FIG. 18 is a flowchart of a method 1800 in accordance with another novel aspect. In a first step (block 1801), an item is received. One or more images of the item are obtained. In a second step (block 1802), the item is identified from the image. In a third step (block 1803), one or more machine learning models are used to generate a modified image with reduced wrinkles. System 1400 in FIG. 14 is one example of a structure that performs method 1800.

Although certain specific embodiments are described above for instructional purposes, the teachings of this patent document have general applicability and are not limited to the specific embodiments described above. For additional information on wrinkle removal, including how to train machine learning models to perform wrinkle detection and how to apply in-painting techniques to correct wrinkles in images, see U.S. Provisional Patent Application No. 63/500,156, entitled "Automated Steam Processing System For Apparel," filed on May 4, 2023, by Cheema et al., the subject matter of which is incorporated herein in its entirety. Accordingly, various modifications, adaptations, and combinations of various features of the described embodiments can be practiced without departing from the scope of the invention as set forth in the claims.

What is claimed is:

1. A system comprising:
   an imaging device configured to capture an image of an item;
   a wrinkle repair processor configured to:
      detect a wrinkle in the image;
      compute wrinkle feature data for one or more wrinkle regions;
      determine, based on the wrinkle feature data, whether the wrinkle is correctable using image processing; and
      when the wrinkle is determined to be correctable, perform an image-editing operation to visibly correct the wrinkle, the image-editing operation comprising one or more of: (i) generating a wrinkle mask identifying pixels associated with the wrinkle, (ii) selecting pixels by comparing mask values to a threshold, and (iii) in-painting the selected pixels to replace pixel colors; and
   a controller configured to:
   when the wrinkle is determined to not be correctable using image processing, generate steam instructions and steaming parameters for the item; and
   transmit the steam instructions and steaming parameters to a steaming system including a control system that operates steam closet functions comprising axis actuators and steam output selectors to steam the item according to the instructions and parameters.

2. The system of claim 1, wherein the item is a garment that is user-wearable.

3. The system of claim 2, further comprising:
   a manual steaming station, wherein an operator manually steams the garment according to the steam instructions.

4. The system of claim 2, further comprising:
   a steam closet controlled by a steam closet control system configured to receive the steaming parameters and operate axis actuators to steam the garment according to the steaming parameters.

* * * * *